United States Patent

Laval

[15] 3,665,471

[45] May 23, 1972

[54] METHOD OF INTEGRATION OF PHASE, INTEGRATOR-PHASEMETER AND THEIR APPLICATIONS

[72] Inventor: Robert Louis Gustave Laval, Chevilly-la-Rue, France

[73] Assignee: Societe Alsacienne De Constructions Mecaniques, Paris, France

[22] Filed: Oct. 20, 1959

[21] Appl. No.: 847,478

[30] Foreign Application Priority Data

Dec. 7, 1958 France........................................778656

[52] U.S. Cl. ............................343/112 R, 235/181, 324/85, 324/88, 343/100 CL
[51] Int. Cl. ..........................................................G01s 5/02
[58] Field of Search ..................235/181; 324/77, 79, 82, 83, 324/85, 87; 323/64, 101; 181/26; 343/100.7

[56] References Cited

UNITED STATES PATENTS 266,243    12/1953    Hurvitz...................................235/181
2,854,191   9/1958    Raisbeck................................235/181

*Primary Examiner*—Rodney D. Bennett, Jr.
*Assistant Examiner*—Daniel C. Kaufman
*Attorney*—Smythe & Moore

[57] ABSTRACT

The present invention relates to a method of phase integration, and an electronic integrator-phasemeter for the application of this method as well as their applications, especially to an electronic correlator intended for the study of narrow band background noises, particularly utilizing the method disclosed in my copending application Ser. No. 847,477 filed Oct. 20, 1959.

3 Claims, 6 Drawing Figures

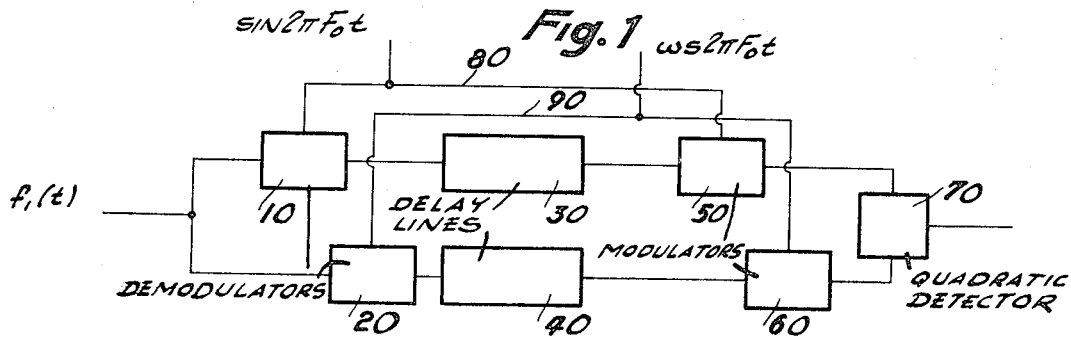
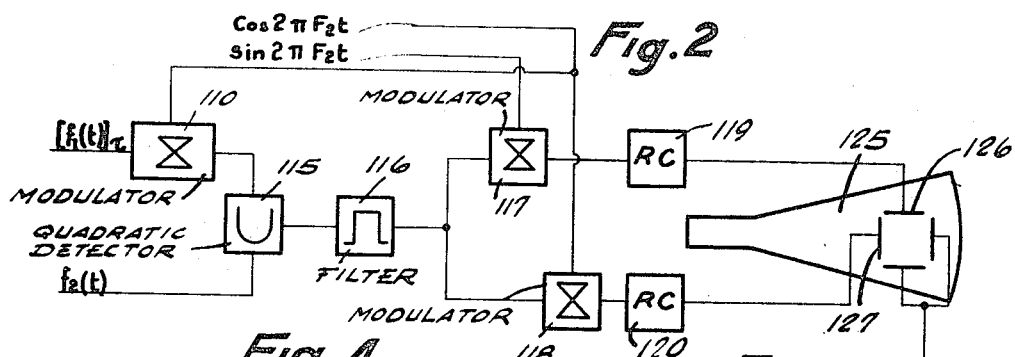
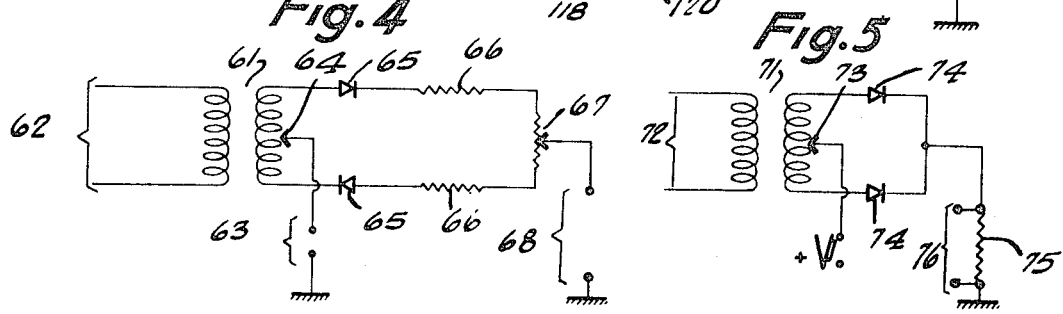
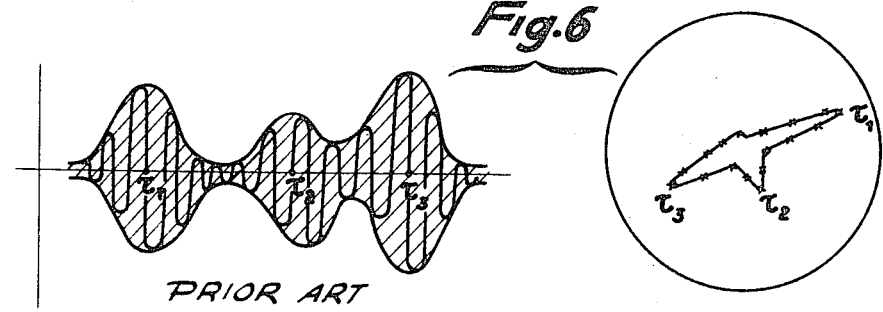
Fig. 6 PRIOR ART
INVENTOR
ROBERT LOUIS GUSTAVE LAVAL

3,665,471

METHOD OF INTEGRATION OF PHASE, INTEGRATOR-PHASEMETER AND THEIR APPLICATIONS

The invention more particularly relates to means intended to be employed for the purpose of detection and/or location of sounds by a number of listening stations, with registration on cathode tubes or on a graph, of the modulus and the argument of what may be referred to as the correlation function of two random narrow band signals, that is to say the registration of a point, the polar coordinates of which represent, as concerns the vectorial angle, the mean value of the phase shift of the two signals or, in other words, the argument of the complex intercorrelation function of said two signals as concerns the radius vector, $\tau = 0$, and, for the modulus of the said function also for $\tau = 0$ where $\tau$ is the delay in time between said two signals.

It will first be recalled that, if one considers two random signals $f_1(t)$ and $f_2(t)$, the intercorrelation function $\rho_{1,2}(\tau)$ of these two signals is the mean value of the product of $f_2(t)$ by $f_1(t)$ having incurred a delay $\tau$, which is expressed by (1) $\rho 1.2\ \tau = \overline{f_1(t-\tau)\,f_2(t)}$ (the line signifies the mean value) which is a function of $\tau$.

In the case in which the signals $f_1(t)$ and $f_2(t)$ have a frequency spectrum limited to a narrow band which is symmetrical with respect to the central frequency $F_0$, their intercorrelation function $\rho_{1,2}(\tau)$ may be set forth in the form:

$$\rho_{1,2}(\tau) = A(\tau)\cos[2\pi F_0\tau + \phi(\tau)] \quad (2)$$

This function is represented in the scale of $\tau$ by a sine wave, of which the amplitude $A(\tau)$ and the phase at the origin $\phi \tau$ are slowly variable functions as compared with the period $1/F_0$. This variation becomes slower as the pass-band becomes narrower.

On the other hand, $\rho_{1,2}(\tau)$ may be considered as the real part of the complex function:

$$A(\tau)e^{j\varphi(\tau)} \cdot e^{j 2\pi F_0 \tau} \quad (3)$$

$j$ being the symbol of imaginaries

If $F_0$ is known, this real part is entirely determined by the function $R(\tau)$:

$$R(\tau) = A(\tau)\,e^{j\varphi(\tau)}; \quad (4)$$

which will be given the name of complex intercorrelation function.

In the particular case in which the two functions $f_1(t)$ and $f_2(t)$ are derived one from the other by a mere time shift in time $\theta$, the intercorrelation function $\rho_{1,2}(\tau)$ is equal to the autocorrelation function of any one of the signals $f_1(t)$ or $f_2(t)$ shifted in time by $\theta$ with respect to the origin.

$$\rho_{1,2}(\tau) = \rho(\tau + \theta) \quad (5)$$

It is known that the autocorrelation function $\rho(\tau)$ of $f_1(t)$, which is identical to that of $f_2(t)$, is expressed by $$\rho(\tau) = \overline{f(t-\tau) \times f(t)} \quad (6)$$

The autocorrelation function of an indeterminate function which is the Fourier transform of its energy spectrum may be expressed as follows:

$$\rho(\tau) = a(\tau)\cos 2\pi F_0 \tau, \quad (7)$$

if the spectrum is symmetrical with respect to $F_0$.

The intercorrelation function $\rho_{1,2}(\tau)$ is then expressed as follows:

$$\rho_{1,2}(\tau) = a(\tau + \theta)\cos 2\pi F_0(\tau + \theta) \quad (8)$$

and the complex intercorrelation function becomes:

$$\rho_{1,2}(\tau) = a(\tau + \theta)e^{j 2\pi F_0 \theta} \quad (9)$$

It may be seen that the argument $\phi = 2\pi F_0\theta$ is then independent of $\tau$ and has the same expression as the phase shift of two pure sinusoids having a frequency $F_0$ displaced in time by $\theta$.

It results from the foregoing that the measurement of small correlations by means of a correlator is theoretically unlimited. In practice, however, the time of integration $T$ of the function $f_1(t-\tau) \times f_2(t)$ is limited and there remain fluctuations about the mean theoretical value. It is therefore only possible in practice to proceed to the measurement if the amplitude of the function of correlation (i.e. of the modulus of $R(\tau)$ in the case of narrow bands) is greater than said fluctuations.

In the case of a rectangular spectrum $\Delta F$ and of small coefficients of coupling between $f_1$ and $f_2$, it can be shown that the mean quadratic value of the fluctuations is:

$$\omega = a^2 \sqrt{T \Delta F}; \quad (10)$$

in this expression, $a$ is the mean quadratic value of $f_1$ and $f_2$ which are assumed to be equal.

When it is required to measure a path length difference, it is possible to define the signal/noise ratio $= s$, the "signal" being defined by the coherent value, simply displaced in time, of each signal received. The intercorrelation function passes through a maximum $s^2 a^2$ for $\tau = \theta$. The equation (10) shows that the measurement is limited to the values of $s$ which satisfy the condition $$s^2\sqrt{T\Delta F} > 1 \quad (10')$$

Starting from these known principles, the idea was then conceived of developing them within the scope of the invention described in the patent application cited above.

The functions $f_1(t)$ and $f_2(t)$ may be expressed in the form of sinusoidal voltages having a frequency $F_0$, the instantaneous amplitude and phase of which are modulated by the indeterminate or random functions of time $a(t)$ and $\phi(t)$ $$f_1(t) = a_1(t)\sin[2\pi F_0 t + \phi_1(t)] \quad (11)$$
$$f_2(t) = a_2(t)\sin[2\pi F_0 t + \phi_2(t)].$$

The variations in time of the terms $a_1(t)$, $a_2(t)$, $\phi_1(t)$ and $\phi_2(t)$ become slower as compared with the period $1/F_0$ as the pass-band becomes narrower.

It can easily be shown that the complex intercorrelation function is written as follows:

$$R(\tau) = \frac{1}{2}\cdot \overline{a_1(t-\tau)a_2(t)\cos[\varphi_1(t-\tau)-\varphi_2(t)]}$$
$$+ \frac{1}{2}j\overline{a_1(t-\tau)a_2(t)\sin[\varphi_1(t-\tau)-\varphi_2(t)]} \quad (12)$$

It is necessary to calculate the real part and the imaginary part of $R(\tau)$ which will subsequently be respectively applied to the vertical and horizontal plates of an oscilloscope.

For this purpose, a function $[f_1(t)]_\tau$ is obtained which is equal to the function $f_1(t)$ in which the terms representing the amplitude modulation $a_1(t)$ and the phase modulation $\phi_1(t)$ have been subjected to a delay $\tau$.

$$[f_1(t)]_\tau = a_1(t-\tau)\sin[2\pi F_0 t + \phi_1(t-\tau)] \quad (13)$$

This function does not contain any term of $2\pi F_0 t$ which would represent the phase displacement of the carrier wave if the function $f_1(t)$ were itself delayed:

$$f_1(t-\tau) = a_1(t-\tau)\sin[2\pi f_0(t-\tau) + \phi_1(t-\tau)]$$

If $f_1(t)$ is written in the following form, which is identical to the first (equation 11):

$$f_1(t) = a_1(t)\cos\phi_1(t)\sin 2\pi F_0 t + a_1(t)\sin\phi_1(t) \quad (14)$$
$$\cos 2\pi F_0 t$$

it can be seen that it is possible to isolate the two terms $$a_1(t)\cos\phi_1(t) \text{ and } a_1(t)\sin\phi_1(t) \quad (15)$$

in demodulators fed demodulating $f_1(t)$ by the two voltages in quadrature $$\sin 2\pi F_0 t \text{ and } \cos 2\pi F_0 t$$

The demodulated voltages 15 may be delayed by $\tau$, by means of two delay lines.

If the voltages 15 which are delayed by $\tau$ subsequently modulate the same carrier waves $\sin 2\pi F_0 t$ and $\cos 2\pi F_0 t$, and if these are added together, we have:

$$[f_1(t)]_\tau = a_1(t-\tau)\cos\phi_1(t-\tau)\sin 2\pi F_0 t + a_1(t-\tau)\sin$$
$$\phi_1(t-\tau)\cos 2\pi F_0 t$$
$$= a_1(t-\tau)\sin[2\pi F_0 t + \phi_1(t-\tau)]$$

The invention is fully described hereinafter, reference being made to the appended drawings, in which:

FIG. 1 is a block diagram of a circuit adapted to carry out the above described demodulating, phase shifting, remodulating and addition operations;

FIG. 2 is a theoretical block demonstrating the basic principle of the present invention;

FIG. 4 is a detailed diagram of the modulators in the circuit of FIG. 3;

FIG. 5 is a similar diagram of the quadratic detector of FIG. 3;

FIG. 6 is a comparative diagram showing the results obtained by a device of known type and according to the invention, respectively.

Figure 3:
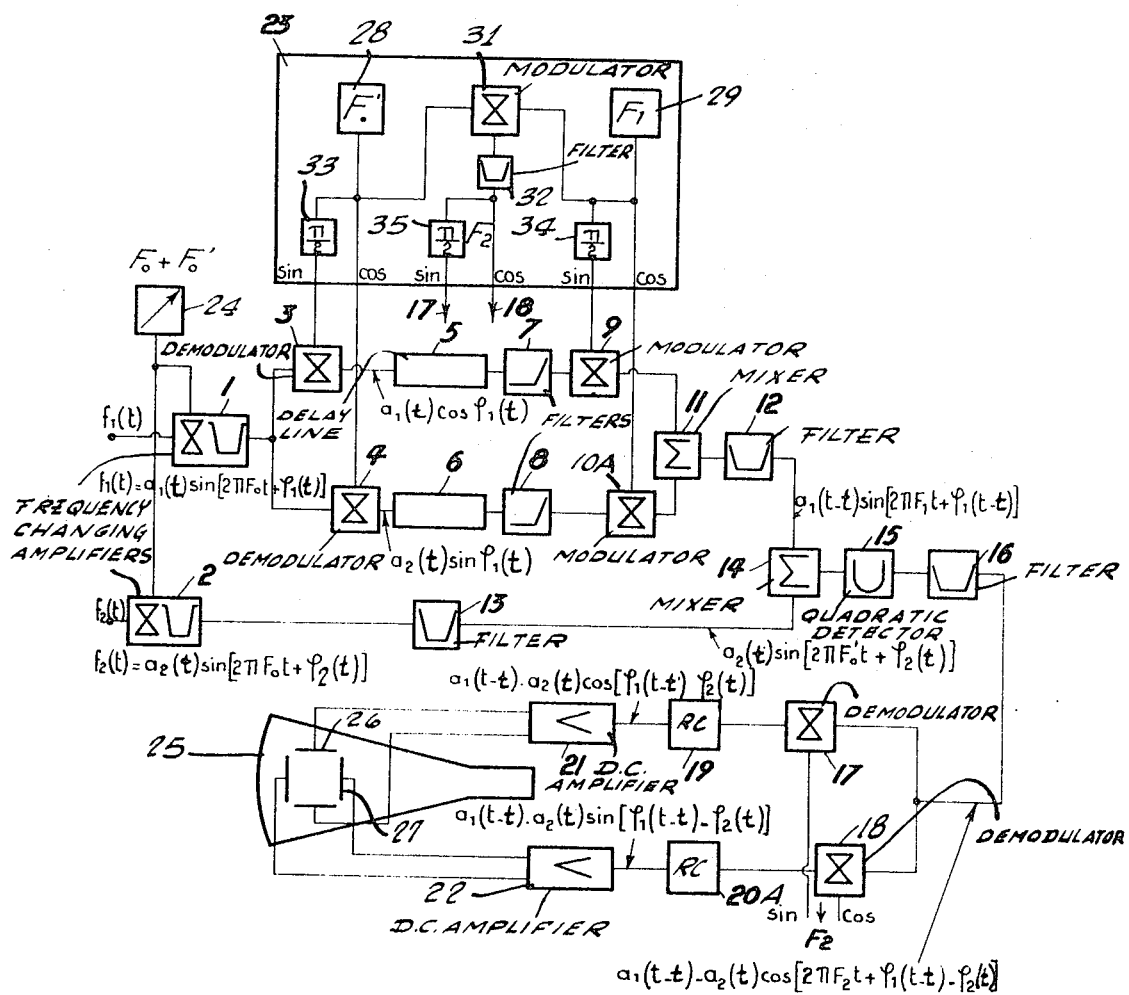
FIG. 3 is a detailed block diagram of an integrator phasemeter circuit according to the invention.

In the circuit shown in FIG. 1 the function $f_1(t)$ passes through two modulators 10 and 20 then two delay lines 30, 40 with variable delay $\tau$ and then through two modulators 50 and 60 to an integrator 70 producing the function required $[f_1(t)]_\tau$; the demodulators 10 and 20 are respectively connected to the modulators 50 and 60 by lines 80 and 90 in which are introduced the voltages in quadrature $\sin 2\pi F_o t$ and $\cos 2\pi F_o t$.

It is easily proved that the expressions (15) which represent the modulation of two carriers in quadrature by a Gauss signal, the spectrum of which has a width $\Delta F$ centered on $F_o$, are two independent functions of time, the spectra of which are comprised between 0 and $\Delta F/2$.

The delay lines should therefore have a cutoff frequency which is greater than $\Delta F/2$. Their construction is much easier than in the case of the standard correlator in which the cutoff frequency has to be greater than $F_o$.

On the other hand, it is easy to see that the real part of $R(\tau)$ (see equation 12) is equal to the mean value of the product.

$$[f_1(t)]_\tau \times f_2(t) = a_1(t-\tau)a_2(t)\cos[\phi_1(t-\tau)-\phi_2(t)]; \quad (17)$$

In order to obtain the imaginary part, the spectral components of $[f_1(t)]$ should be delayed by $\pi/2$ to obtain the product. In theory, a phase shifting circuit should therefore be provided, capable of shifting the phase by $\pi/2$ without introducing any relative variation of amplitude in the frequency band $\Delta F$, this condition becoming critical if $\Delta F/F$ is not very small.

In order to overcome the difficulties created by the direct electronic application of the above calculation under the conditions at present known, that is to say multiplication and phase-shift with a relatively wide band without amplitude variation, the concept which was developed in accordance with the present invention, was to operate the quadratic detection (also called parabolic detection, wherein the output voltage is the square of the input voltage, because the detector has a parabolic rectification curve) of two signals to be compared after having transposed the central frequency of one of the signals to a second frequency, to remodulate the voltage of the two detected signals by a carrier voltage having a frequency equal to the difference of the two said frequencies and a carrier voltage of the same frequency in phase quadrature with the first carrier voltage, to isolate by any suitable known means the mean value of the voltage obtained and to apply this mean value to the horizontal and vertical deflection of a cathode-ray tube or of a graph.

The foregoing may be explained as follows with reference to the circuit shown in the block diagram of FIG. 2.

By changing the frequency by a carrier having a frequency $F_2 = F_1 - F_o$, the signal $[f_1(t)]_\tau$ may be transposed about a central frequency $F_1$. The sum is then detected of $[f_1(t)]_\tau$ transposed and of $f_2(t)$ by a quadratic detector of any known type, which thus produces the following operation:

$$\{a_1(t-\tau)\sin[2\eta F_1 t + \varphi_1(t-\tau)]$$
$$+ a_2(t)\sin[2\eta F_o(t) + \varphi_2(t)]\}^2 \quad (18)$$

By analyzing the expression (18) it can be seen that the spectrum of the voltage thus obtained comprises a number of frequency bands represented by terms in $F_1 + F_o$, $2F_1$, $2F_o$, very low frequency, such as $a_2(t)\sin \phi_2(t)$, and finally a term in $F_1 - F_o$ which is expressed as follows:

$$a_1(t-\tau)a_2(t)\cos[2\pi(F_1-F_o)t + \phi_1(t-\tau) - \phi_2(t)] \quad (19)$$

The frequency band which corresponds to this term, the width of which can be proved to be $2\Delta F$ is, in accordance with the invention, isolated by a filter and remodulated by two voltages in quadrature at the frequency $F_2$. These two voltages may be expressed as follows:

$$\sin 2\pi F_2(t) \text{ and } \cos 2\pi F_2(t)$$

$\cos 2\pi F_2(t)$ is the voltage which has been employed to transpose the frequency of $[f_1(t)]_\tau$. The term $F_1-F_o$ (expression 19 above) becomes:

$$a_1(t-\tau) \cdot a_2(t)[\cos \phi_1(t-\tau) - \phi_2(t)] \quad (20)$$

if it is remodulated by the voltage $\sin 2\pi F_2 t$, and $$a_1(t-\tau) \cdot a_2(t)[\sin \phi_1(t-\tau) - \phi_2(t)] \quad (21)$$

if it is remodulated by the voltage $\cos 2\pi F_2(t)$.

Voltages will thus be obtained which will be proportional to the real and imaginary parts of the expression $R(\tau)$ (equation 12) by isolating the mean value of the voltages defined above by the expressions (20) and (21). In accordance with the invention, this isolation is ensured by an RC circuit which is substantially equivalent to an integrator operating over a time $T$ such that $$T = RC$$

In recapitulating with respect to the block diagram of FIG. 2, the signal $[f_1(t)]_\tau$ is fed to a modulator 110, which is also fed a voltage $\cos 2\pi F_2 t$ thereby transposing the frequency of $[f_1(t)]_\tau$ to a new central frequency $F_1$. A quadratic detector 115 fed a signal $f_2(t)$ and the signal of $[f_1(t)]_\tau$ transposed detects the sum (expression 18) of these two signals. The detector output, which is the sum, is fed to a filter 116 that isolates the term $F_1 - F_o$ (expression 19), which is fed to two remodulators 117 and 118, remodulator 117 receiving a voltage $\sin 2\pi F_2 t$ and remodulator 118 $\cos 2\pi F_2 t$, thereby producing at their outputs voltages representing, respectively, expressions (20) and (21). The means values of these voltages are isolated by RC circuits 119, 120 and applied to the deflection plates 126, 127 of a cathode ray tube 125.

In FIG. 3 of the accompanying drawings is shown a detailed diagram of the circuit of an integrator-phasemeter in accordance with the invention and which, in combination with the method forming the object of my above referred to copending application, constitutes a complete correlator. The diagram relates to a device for the study of sounds in the range of sound frequencies from 5 to 25 kilocycles.

As the sounds considered generally have a very extensive frequency-spectrum, input amplifiers 1 and 2 of the frequency-changing type, isolate a band $\Delta F$ about a frequency $F_o$ which it is possible to vary in the above indicated range of from 5 to 25 kilocycles. Said frequency changing amplifiers 1 and 2 are fed, on one hand, the signals $f_1(t)$ and $f_2(t)$, respectively, and, on the other hand, a frequency $F_o + F'_o$ from a generator 24.

The filtering operation is carried out on the intermediate frequency. The demodulation of the first signal $f_1$ is carried out starting from two voltages in quadrature, the frequency of which is $F'_o$, the exact center of the passband of the intermediate frequency filters. $F'_o$ is also the center of the energy spectrum transposed in frequency and isolated by the filter so long as the variation of spectral energy density is negligible within the pass-band being studied.

The intermediate frequency is in this case centered on 10 kilocycles. As a result, $F'_o = 10$ kilocycles, $F_1 = 15$ kilocycles, $F_2 = F_1 - F'_o = 5$ kilocycles.

The process of remodulation at the frequency $F'_o$ followed by a transposition about the central frequency $F_1$ is condensed into a single operation. The low-frequency signals at the outputs of the delay lines are directly modulated by the carriers at the frequency $f_1$.

A frequency generator 23 is therefore provided to supply the three frequencies $F'_o$, $F_1$ and $F_2$ each delivered in the form of two voltages in quadrature which may be referred to as sine and cosine. In order to ensure the necessary coherence, $\cos F_2$ is obtained by beating $\cos F'_o$ with $\cos F_1$.

Said generator 23 comprises generators 28 and, 29 supplying voltages $\cos F'_o$ and $\cos F_1$, respectively, and said voltages are applied to a modulator 31, the output of which is connected to an amplifier 32 comprising a filter centered on frequency $F_2$ at the output of which voltage $\cos F_2$ is collected. At the output of generators 28, 29 and of amplifier 32 are also branched phase shift circuits 33, 34 and 35, respectively, which are adapted to shift the phase of the respective voltages by $\pi/2$, thus supplying voltages $\sin F'_o$, $\sin F_1$ and $\sin F_2$, respectively.

The outlet of amplifier 1 is connected to a circuit of the type hereabove described with reference to FIG. 1 and including two parallel branches each comprising in succession a modulator 3, 4, delay lines 5, 6, low pass filters 7, 8 and modulators 9, 10A Voltages sin $F'_o$ and cos $F'_o$ from generator 23 are fed to modulators 3, 4 respectively and voltages sin $F_1$ and cos $F_1$ to modulators 9, 10A, respectively.

Modulators 3, 4, 9, 10A, as well as the other modulators mentioned hereinafter, are of the conventional, simple alternance type shown at FIG. 4, and each having a transformer 61 to the input 62 of which is applied the modulating voltage, the carrier or voltage which is to be modulated being applied at 63 to the center tap 64 of the secondary of said transformer, two silicon diodes rectifiers 65, two resistors 66 of fixed value and a balancing potentiometer 67, the modulated voltage being collected at 68.

Delay lines 5, 6 allow $\tau$ to be varied in a discontinuous manner by switching of the number of delay circuits, which are connected to one another within a line. The lines have a cutoff frequency of 1,500 kilocycles and a characteristic impedance of 15,000 ohms. The delay per cell is 0.25 ms.

Low-pass filters 7 and 8 eliminate the remaining portion of the voltage at 10 kilocycles before the remodulation of the low frequency terms.

The outputs of modulators 9, 10A are fed to a T-type mixer 11, i.e. a T network of resistances for summing said outputs.

The outputs of modulators 9, 10A are fed to a T-type mixer 11, i.e. a T network of resistances for summing said outputs.

12 is an amplifier comprising a filter at 15 kilocycles;

The output of amplifier 2 is applied to a band-pass filter 13, the phase law of which is determined so as to compensate, by an equivalent delay on $f_2(t)$, the group delay introduced on the modulation of $[f_1(t)]_\tau$ by the phase/variation, in dependence of the frequency, of the filters 7, 8 and 12. The outputs of amplifier 12 and of filter 13 are applied to another T-type mixer 14 which feeds a quadratic detector 15 comprising (FIG. 5) a transformer 71 to the input 72 of which is fed the output of mixer 14, a D.C. bias voltage being applied to the center tap 73 of the secondary, two silicon diode rectifiers 74 and a grounded load resistor 75. The detected voltage, which may be made proportional to the square of the output voltage, is collected at the terminals 76 of the load resistor. By using paired diodes and by correctly selecting the bias voltage (approximately 0.5 v) and the load resistance, the rectification curve obtained is a good approximation to a parabola for voltages comprised between 0 and 1.5 volts.

It should further be observed that the accuracy of the parabolic law only influences the measurement of the modulus of $R(\tau)$, the measurement of the modulus of $\phi(\tau)$ always being correct irrespective of the law of the non-linear element employed.

A filter 16, connected at the output of detector 15 isolates the term:

$$a_1(T-\tau)a_2(\tau)\cos[2\pi F_2 t + \phi_1(t-\tau) - \phi_2(t)]$$

which is fed to a circuit of the type described hereabove with reference to FIG. 2. Said circuit comprises two branches each including a demodulator 17, 18, an RC circuit 19, 20A the time-constant of which may be selected from 20 ms, 0.1s or 1s by switching the capacity thereof. Voltage sin $F_2$ from phase shift circuit 35 and cos $F_2$ from amplifier 32 are applied to modulators 17 and 18, respectively.

The said branches further comprise two direct-current amplifiers 21 and 22 for the carrier frequency of 1 kilocycle. The outputs of said amplifiers are applied to the plates 26 and 27, respectively of the cathode-ray tube 25.

The full-wave output demodulator supplies the direct current deflection voltage of the tube. It utilizes diodes with silicon junctions with high inverse voltage.

The gain of these amplifiers may be varied by discontinuous switching.

It is useful at this point to name the advantages which the device in accordance with the invention makes it possible to achieve and which are due both to the creation of the integrator-phasemeter as well as its combination with the method described in detail in my co-pending application above referred to.

The polar curve of the complex function of intercorrelation of the kind which the device enables to be traced on a cathode-ray tube or a graph and in which the delay $\tau$ appears as a parameter may be drawn with a substantially smaller number of points than the curve $\rho 12(\tau) = f(\tau)$ which would be traced by an ordinary correlator.

The right-hand curve in FIG. 6 (a case in which two microphones receive the sources of distinct sounds, which sources are to be detected or located as previously explained, and which in the instance of the Figure are three in number, each having a different path length to the microphones), shows the result obtained in accordance with the invention, the left-hand curve represents the curve which would be traced by known devices; it will be appreciated that as the time required to trace a point is in the two cases several times greater than the time of integration, the reduction of the number of points therefore produces a considerable saving of time. On the other hand, the physical interpretation of the result is easier on a polar curve since the phase usually plays a fundamental part.

Finally, the device which has been described behaves like a phasemeter in which the adjustment of $\tau$ to a value approximately equal to $\theta$ enables the coherence of phase to be reestablished between the signals compared, without producing any disturbance on the theoretical phase $2\pi F_o \theta$, and in which the integration permits of the reduction of fluctuations due to imperfection of the previous correction and to the possible presence of incoherent background noises superimposed on the signals.

As for the results obtained, their quality will be appreciated from the following example.

The device permits of the measurement of a time period of path length difference with absolute precision corresponding to a phase shift of about 2°. At 20 kilocycles, this corresponds to approximately 0.3 microsec. The indeterminateness of $2k\pi$ with regard to the phase may be removed if the frequency $F_o$ is made to vary. The frequency-changing input amplifiers facilitate this operation.

This precision is obtained for a signal/noise ratio which is greater by 4 to 5 db than the threshold of perception such as it has been defined (equation 10'). For $\Delta F = 2$ kilocycles, $T = 1$ second, the threshold of perception is theoretically equal to $$S = \sqrt{\frac{1}{T\Delta F}} = \sqrt{\frac{1}{2000}}$$

that is to say, $S \cong 16$ db. Because we are here dealing with the ratio of amplitudes and not with the ratio of powers, the fourth root of the above expression is taken. That is $$20 \log \sqrt[4]{\frac{1}{2000}} = 16 \text{ db}.$$

The performances of stability of the device are sufficient to allow this threshold of perception to be effectively observed.

Stress should therefore be laid on the fact that the simplification achieved in the construction of the device does not in practice detract from its precision.

What I claim is:

1. An integrator phasemeter for the comparison of two narrow frequency band signals having random characteristics, by representation on a graph of a point, the polar coordinates of which represent the argument of the complex intercorrelation function of said two signals for $\tau = 0$ and the modulus of the said function for $\tau = 0$, when $\tau$ is the delay in time between said two signals, the combination including first and second frequency changing input amplifiers adapted to receive first and second signals to be compared, respectively, for isolating a frequency band about a central variable frequency, said first input amplifier feeding one end of a first circuit consisting of first and second branches connected in parallel relation with each including, in series connection between said end and another end thereof, demodulator means, delay means and modulator means, frequency generating means adapted to supply a first voltage having a frequency $F'_o$ to said demodulator means in said first branch and a second voltage of the same frequency $F'_0$ in quadrature with said first voltage to said demodulator means in said second branch, frequency generating means adapted to supply a third voltage having a frequency $F_1$ to said modulator means in said first branch and a fourth voltage of the same frequency $F_1$ in quadrature with said third voltage to said modulator means in said second branch, a first mixer means having two inputs to which are connected said other ends of said first and second branches, respectively, and an output connected to one input of a second mixer, said second mixer having another input and an output, band-pass filter means fed by said second input amplifier and connected to said other input of said second mixer, quadratic detector means having an input connected to said output of said second mixer, and and output connected to one end of a second circuit consisting of a first and second branches connected in parallel relation with each including, in succession between said one end and another end thereof, demodulator means, filter means and direct current amplifier means, frequency generating means connected to supply a fifth voltage to said demodulator means in said first branch of said second circuit and a sixth voltage in quadrature with said fifth voltage to said demodulator means in said second branch of said second circuit, said fifth and sixth voltages having the same frequency $F_2$ intermediate said frequencies $F'_0$ and $F_1$, and means connected to said direct current amplifying means for displaying a graph.

2. An apparatus according to claim 1 wherein the means for displaying the graph is a cathode ray tube.

3. An apparatus according to claims 1 wherein said first and second mixers are simple T type mixers.

* * * * *

UNITED STATES PATENT OFFICE
CERTIFICATE OF CORRECTION

Patent No. 3,665,471    Dated May 23, 1972

Inventor(s) Robert Louis Gustave Laval

It is certified that error appears in the above-identified patent and that said Letters Patent are hereby corrected as shown below:

Patent Front Page, [30], "Dec. 7, 1958" should be --Nov. 7, 1958--; Patent Front Page, [56], "266,243" should be --2,264,342--;

Column 4, line 23, "means" should be --mean--. Column 5, lines 24 and 25, delete entire lines. Column 6, line 45, "$S=\sqrt{\frac{1}{TAF}}=\sqrt{\frac{1}{3000}}$" should be --$S=\sqrt[4]{\frac{1}{TAF}}=\sqrt[4]{\frac{1}{3000}}$--; Column 6, line 73, after "delay" insert --line--.

Signed and sealed this 13th day of August 1974.

(SEAL)
Attest:

McCOY M. GIBSON, JR.          C. MARSHALL DANN
Attesting Officer             Commissioner of Patents